June 1, 1965        B. HOWLAND        3,187,255
SQUARE WAVE INDUCTANCE BRIDGE
Filed Jan. 30, 1961        2 Sheets-Sheet 1
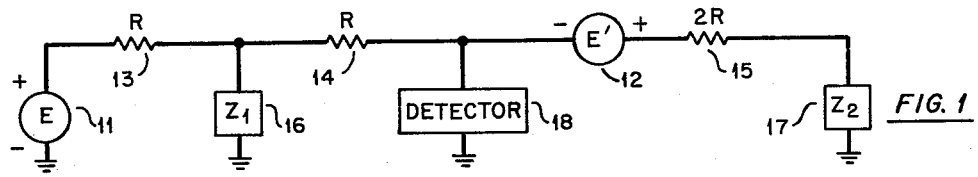
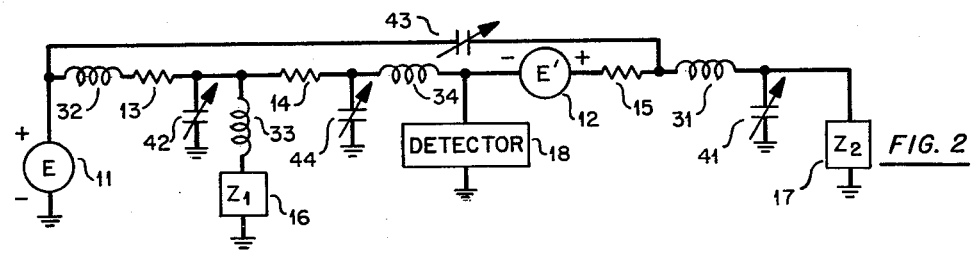
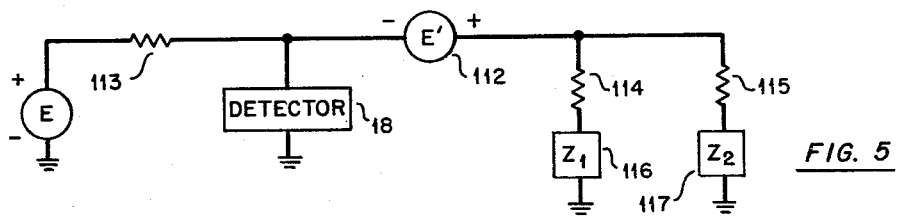
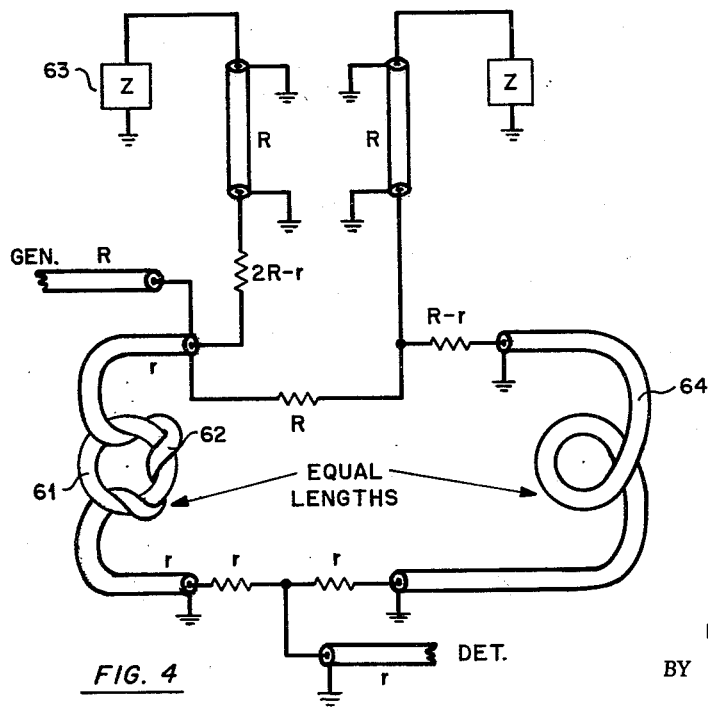
INVENTOR.
BRADFORD HOWLAND
BY Edward D Thomas
AGENT

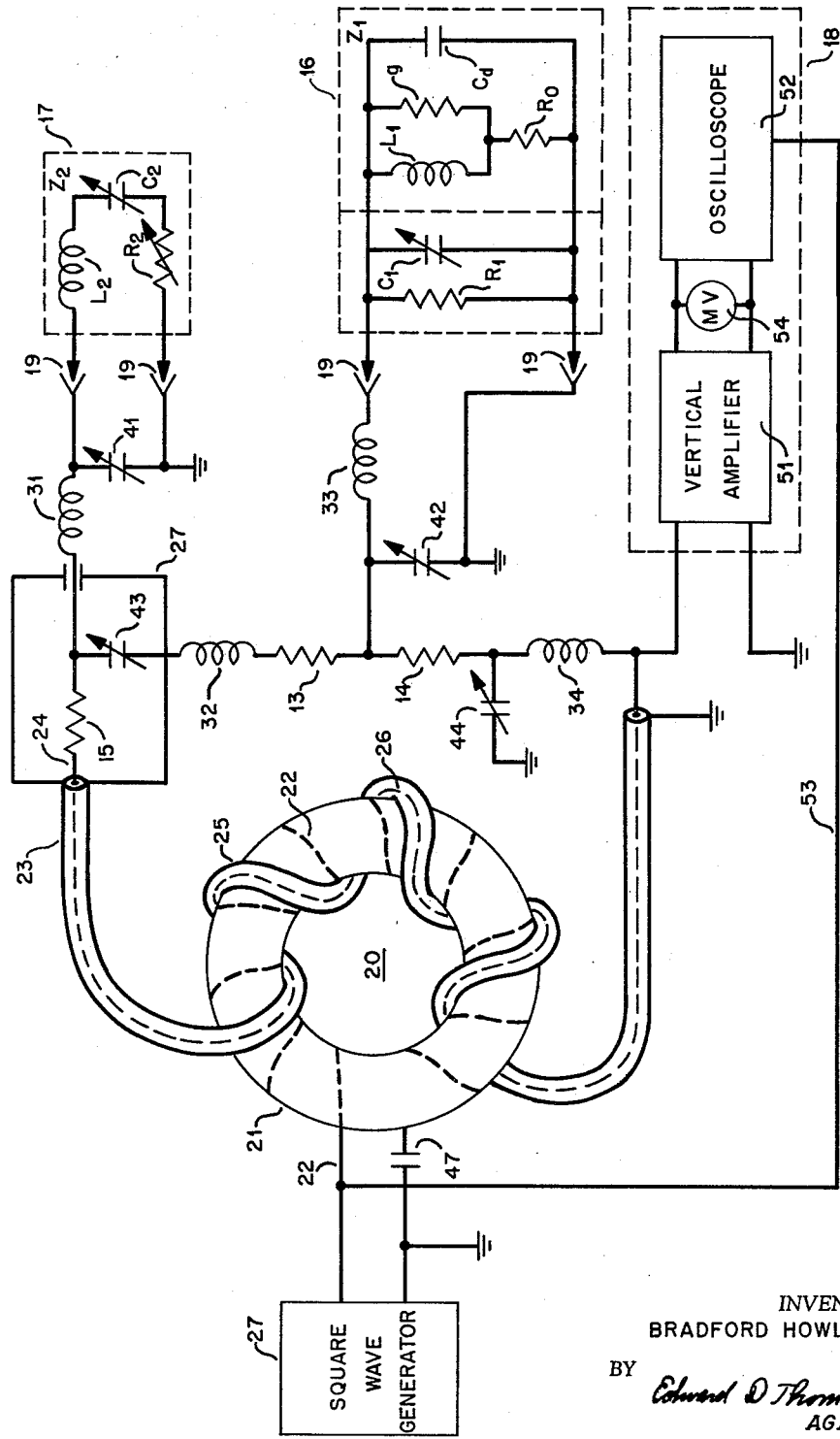

United States Patent Office 3,187,255
Patented June 1, 1965

3,187,255
SQUARE WAVE INDUCTANCE BRIDGE
Bradford Howland, Cambridge, Mass., assignor to Massachusetts Institute of Technology, Cambridge, Mass., a corporation of Massachusetts
Filed Jan. 30, 1961, Ser. No. 85,544
5 Claims. (Cl. 324—57)

The present invention relates to an alternating current inductance bridge and more particularly to a bridge compensated for stray inductances and capacitances and excited by a square wave to determine at a single null measurement the values of inductance, the equivalent series and shunt resistances, and the distributed capacitance of an inductance coil.

If the Q of an inductor at its self-resonant frequency is low, the distributed capacitance will be difficult to measure by resonance methods. More generally, if any two residual properties of an inductance coil are of significance at a given frequency, sine wave measurements at some other frequency supplemented by calculations are required to separate their effects. A square wave bridge separates the effects automatically, and only one null measurement is made. A further advantage of the square wave bridge method is that the residual unbalance provides indication of departure of the inductor from that of the assumed equivalent circuit. In this way various subsidiary phenomena of inductance coils can be directly observed; these include skin effect in the conductor, stationary waves in the windings of large valued inductors and magnetostrictive oscillations of the core.

Some of the desirable features which an impedance bridge ought to possess are: first, one terminal of each of the reciprocal impedances should be at ground potential; second, the transformer, if such be needed, should be of simple construction and must be capable of passing a wide range of frequencies; third, compensation of bridge stray capacitances and impedances should be possible; and, fourth, elaborate internal shielding of the bridge elements should not be necessary.

The Wheatstone bridge and its derivatives, the Maxwell and Hay bridges, fail to meet the first and fourth of these features and probably do not meet the third since it is difficult to achieve tight coupling in a fully shielded transformer. Lamont's constant-resistance network bridge, "A Square Wave Inductance Bridge," Electronic Engineering, vol 27, pp. 357–359, 1955, also fails to meet the first feature and requires some shielding. When the ground point of Lamont's bridge is shifted to meet these objections, the transformer design is complicated and requires shielding. The standard Wayne-Kerr "opposed T" bridge also fails to meet the first feature.

The present invention contemplates a circuit belonging to the general class of bridges consisting of a coil in one arm, fixed resistances in adjacent arms, and the dual equivalent circuit for the coil in the opposite arm. In common with Lamont, a variable capacitance augments the distributed capacitance of the coil and the dual arm circuit contains a fixed inductor, a variable capacitance and one or two variable resistances.

The primary object of the present invention is to provide a square wave inductance bridge which possesses the desired feature that one terminal of both the inductance coil and its dual equivalent circuit is grounded.

The present circuit, which is a synthesis of the twin T and the equal ratio arm bridge circuits, requires that one winding of the equal ratio arm transformer be ungrounded in order to permit the grounding of one terminal of each inductance. This ungrounded winding will require shielding.

Another object of the invention is to provide a transformer of simple construction and wide bandwidth which is easily shielded.

These and other objects of the invention will be more readily understood from the following detailed description taken in conjunction with the accompanying drawings in which:

FIGURE 1 is an elementary block diagram of the bridge circuit.

FIGURE 2 is the block circuit diagram of the bridge circuit including compensation.

FIGURE 3 is the detailed circuit diagram of the bridge showing transformer construction.

FIGURE 4 is a modification of the bridge circuit for high frequency measurements.

FIGURE 5 is a block diagram of an alternate circuit using the same transformer construction as the circuit of FIGURE 1.

Referring now to FIGURE 1, it is assumed that the amplitude E of energy source 11 is equal to the amplitude E' of energy source 12, an assumption which requires the use of a unity ratio transformer with closely coupled windings. Null output at the terminals of detector 18 will be obtained when the transfer impedance of the T network equals the series impedance of the other branch of the circuit; i.e. when $2R + R^2/Z_1 = 2R + Z_2$, or $Z_1 Z_2 = R^2$.

It is noted that one terminal each of energy source 11, impedance 16, detector 18, and impedance 17 are grounded leaving only energy source 12 ungrounded. Therefore, the use of a transformer as the source of energy for the bridge requires shielding for this winding.

The complete bridge circuit is shown in FIGURE 2 and is seen to include four compensating inductances 31, 32, 33 and 34 and four trimmer condensers 41, 42, 43 and 44. Other than the trimmer condensers, the bridge contains no controls except variable elements in impedance arms $Z_1$ and $Z_2$. This type of construction enables the bridge to operate in conjunction with variable elements such as decade resistance boxes, precision variable capacitors and standard inductors added externally in the $Z_1$ and $Z_2$ arms. This is generally possible, without additional shielding, and with little or no loss in accuracy as a consequence of the ground connection common to $Z_1$ and $Z_2$.

The shielding requirements for the energy source are met by the transformer construction shown in FIGURE 3. The magnetic core 21, of transformer 20, is a "supermalloy" tape-wound toroid encased in nylon, such as is presently manufactured by Arnold Engineering Company under the designation No. 4T–5233–S1. The outside diameter is 1.5 inches. The primary winding 22 is a single layer winding of 40 turns of No. 22 plastic insulated wire. The secondary windings 25 and 26, a single layer of coaxial cable 23, consist of twenty turns wound directly on top of the primary winding 21. The number of turns was chosen in each case such as to occupy the entire circumference of the core 21. The coaxial cable 23 used for the secondary windings was chosen for its small size, 0.104 inch diameter; low characteristic impedance, 23 ohms; and low resistance, 0.012 ohm/foot. Since the total length of the cable was 5 feet, the cable resistance had negligible effect on the balance of the bridge.

When the inner conductor 24 of the coaxial cable 23 is used as the off-ground energy source 12, shielding is furnished by the outer conductor of the coaxial cable. The shielding of the outer conductor of coaxial cable 23 is extended to include shield 27 as shown in FIGURE 3 containing the fixed resistor 15 and capacitor 43. Except at high frequencies, the voltage difference between the two windings 25 and 26 will be everywhere the same, and the effect of their close proximity will be to add capacitance across the terminals of detector 18. So placed, this interwinding or intershield capacitance of transformer 20 has no effect on the bridge at balance.

Saturation of the core 21 of transformer 20 determines the useful low frequency limit of the bridge. A 1000 cycle square wave of 3 volts R.M.S. can be applied to the primary winding 22 without core saturation; correspondingly higher voltages can be used at higher frequencies. In reverse operation, that is with source and detector interchanged, saturation will not occur, but signals below 10 kc. are attenuated because of the limited inductance of the secondary winding. A condenser 47 is connected in series with the primary winding 22 and the square wave source 27 to prevent saturation of core 21 should the square wave contain a D.C. component.

The high frequency response of the bridge is taken to be the transmission which obtains with 100 ohms in one arm and the other arm open circuit. For direct operation, this measured to be 3 db down at 350 kc., for reverse operation, 3 db down at 1 mc. The difference is due to the capacitance between secondary windings, approximately 600 $\mu\mu f.$, which shunts the detector in direct operation and the generator in reverse operation.

For the main bridge elements, resistors 13, 14 and 15, wire-wound, non-inductive mica card resistors wound to a tolerance of $\pm 0.05\%$ were used. The value of $R=1000$ ohms is chosen so that a capacitance of N $\mu\mu f.$ will exactly balance an inductance of N microhenrys in the dual arm. Compensating inductors 31, 32, 33, and 34 are wound on low loss Ferramic Q toroidal cores, such as can be obtained from General Ceramics Company, No. CF-111. It is preferred to wind inductor 33 with heavy Litz wire (220/41) to render skin effect negligible. The temperature coefficient of these inductances is that of the core, nominally less than 0.1% per degree centigrade, and was such as to require occasional realignment of the bridge with changes of ambient temperature. Inductors 32 and 34 had 8 turns, inductor 33, 10 turns, and inductor 31, 12 turns to give inductances of 5, 7, and 9.5 microhenrys respectively.

The bride of FIGURES 2 and 3 will be in perfect alignment if it gives null output with square wave input for the three connections listed in Table I.

*Table I*

| Case | $Z_1$ | $Z_3$ | Adjustments |
|---|---|---|---|
| (a) | Shorted | Open | Capacitor 41. |
| (b) | Open | Shorted | Capacitors 42 and 44. |
| (c) | 1,000 ohms | 1,000 ohms | Capacitor 43. |

The 1000 ohm resistances in case (c) are assumed to be compensated with respect to stray capacitances and inductance following the well known procedures, recommended for example, in the recent General Radio Company catalogs. The alignment procedure requires verification of the resistive balance and adjustment of the capacitive balance for all three of the connections in Table I.

To illustrate the alignment procedure, which compensates for stray capacitance and inductance in the bridge, a square wave generator 27 supplying a 10 kc. square wave having a 5 volt. R.M.S. amplitude was applied to the primary winding 22 of the bridge transformer 20. An oscilloscope 53 having a vertical amplifier 51 is used as detector 18. Amplifier 51 possessed a bandwidth of 350 kc. and with the oscilloscope provided a sensitivity of 1 mv./cm. The horizontal sweep of oscilloscope 52 is synchronized with square wave source 27 by connection 27. An R.M.S. voltmeter 54 is connected across the output of amplifier 51 for use when an exact null balance cannot be expected.

The resistive unbalance of the bridge is indicated by the transmission of the low frequency components of the square wave, the capacitive balance by transients coincident with the jumps of this wave. Resistive balance should occur automatically in case (a); in case (b) if the bridge resistances are in the proper proportion, and in case (c) with the proper choice of exterior resistances. Balance in case (b) should occur to within a few parts in 10,000 since the resistors specified tend to meet this accuracy.

Capacitive balance requires setting the four trimmer capacitors, 41, 42, 43, and 44. Capacitors 41 and 42 are adjusted to make the capacitances across $Z_1$ and $Z_2$ effectively zero minimizing unbalance by varying capacitor 41 in connection (a) and then capacitor 42 in connection (b). Capacitor 43 adjusts the time constant of such identical external resistors as would produce null output in case (c). Capacitor 44 and inductor 34 form a section of artificial line which, when capacitor 44 is in proper adjustment, equalizes the delay the current in $Z_2$ experiences in passing through cable 23 to detector 18. The adjustments of the trimmer capacitors are made first with connection (a), then (b) and then (c) as indicated in Table I.

Since these controls are essentially noninteracting, the procedure is straightforward and need be repeated only once. A significant residual error indicates faulty construction of the bridge.

For adjustment of capacitor 43 in connection (c) it is necessary that the product of the externally connected impedances be both real and equal to $10^6$ ohms$^2$. To ensure that this product is in fact a real number, various procedures are employed. First, General Radio type 500H precision 1000 ohm resistors, compensated according to the manufacturer's recommendations, can be used as $Z_1$ and $Z_2$. Second, two resistors can be compensated by the addition of capacitance and inductance, using a high frequency impedance bridge, such as Boonton type 250-A RX meter. A third method is to balance an inductance of known equivalent shunt conductance against its dual circuit. Since the bridge is intended to be used for similar measurements utilizing this third method, alignment by this means may introduce a systematic error. These three methods of setting condenser 43 were found to agree to within 0.5 $\mu\mu f.$ The bridge with its associated equipment as described above is capable of detecting capacitive unbalances of the order of 0.1 $\mu\mu f.$ and correspondingly small inductances. Connections to the bridge must be made in a definite manner to minimize errors due to stray inductances and capacitances. I recommend as a regular procedure the mounting of all external components in banana plugs and jacks, designated in FIGURE 3 by the numeral 19, having known self-capacitance and inductance. General Radio Company plugs having a capacitance of 0.8 $\mu\mu f.$ and an inductance of 20 m$\mu$h. have been found suitable.

As a preliminary test of the completed and aligned bridge, a high quality variable air condenser was placed in the series arm at $Z_2$, and an 87 $\mu$h. coil having low series resistance, 0.05 ohm, and low distributed capacitance, 1.8 $\mu\mu f.$, was placed in the shunt arm at $Z_1$. With adjustment of the variable condenser, the bridge was balanced to a fair null, the residual unbalance being equivalent to that caused by a 0.3 $\mu\mu f.$ capacitive unbalance. The coil and condenser were then found to have numerically equal inductance in microhenrys and capacitance in picofarads respectively. The aforesaid coil consisted of a single layer winding of 46 turns of Litz wire wound on a four inch length of "Ferramic Q" antenna rod.

It was discovered empirically that the bridge null could be improved considerably by shunting the variable capacitor with a 20 megohm half-watt carbon composition resistor. Evidently non-ohmic losses in the resistor balanced magnetic losses in the inductor. Accordingly, whenever this inductor is used in one arm to offset a capacitor in the opposite arm, the 20 megohm resistor is shunted across the capacitor.

For greatest accuracy, a substitution method is employed to measure the characteristics of an inductance coil $L_1$.

The series arm, $Z_2$, consists of a decade resistance box $R_2$, a precision variable condenser $C_2$ and the above-mentioned 87 $\mu$h. inductor $L_2$. The shunt arm, $Z_1$, includes a precision variable condenser $C_1$ shunted by the above-mentioned 20 megohm resistor and a 6.8 megohm resistor, to offset the wiring resistance of the series arm $Z_2$, both shunt resistors being represented by $R_1$ in FIGURE 3.

Using a 10 kc. square wave as before, and with $C_2$ shorted, $R_2$ and $C_1$, are adjusted for the best null balance. Next the short is removed from $C_2$ and the inductance coil $L_1$ is connected across capacitor $C_1$. $C_1$, $C_2$ and $R_2$ are then serially adjusted for minimum R.M.S. output on meter 54. Rough balancing is accomplished by observation of the unbalance waveform on oscilloscope 52, the final balance is best achieved with the aid of meter 54. Since the separate unbalance waveforms vary greatly from one measurement situation to another, they are not illustrated in the drawing.

The equivalent shunt conductance $g$ of the coil $L_1$ is given by the change in resistor $R_2$ between the two balance conditions. The distributed capacitance $C_d$ by the change in capacitor $C_1$, taking into consideration a correction for any incremental inductance of resistance $R_2$. The inductance $L_1$ is given by the value of $C_2$ directly. The series resistance $R_0$ is here assumed to be so small as to require no compensation in the series arm.

A standard 1.0 millihenry inductor, General Radio Type 1481–A, was measured in this way. The measured self-resonant frequency of the coil is 1090 kc., corresponding to $C_d = 21$ $\mu\mu$f. The bridge measurement for $C_d$ is 19.5 $\mu\mu$f. From a measurement of $Q=23.5$ at 250 kc., the equivalent shunt conductance $g=27.5$ $\mu$mhos is derived while the bridge measurement is $g=28.5$ $\mu$mhos. $C_5$ was determined to be within 1% of the expected value of 1000 $\mu\mu$f.

Any residual unbalance in the foregoing measurement is believed to be a result of losses in the inductor having no counterpart in the assumed equivalent circuit, as for example, the so-called "intrinsic loss" of the magnetic material used in the core of the standard inductor, and only in very small part of imperfections in the bridge itself. An indication of the size of this residual unbalance may be had from the change $\Delta C_1$ of 1.7 $\mu\mu$f., $\Delta C_2$ of 2.2 $\mu\mu$f. or $\Delta R_2$ of 2.9 ohms which produced a fifty percent increase of unbalance over the residual. By careful observation, an order of magnitude smaller change of each can be detected.

In the foregoing measurements, it should be noted that the square wave was used first to excite the bridge during the alignment procedure to compensate the bridge for its stray impedances, and second as a means of comparing the inductance with its dual circuit. Either of these functions may be omitted. Any bridge with frequency-independent balance equation, properly compensated for residual errors that does not require initial balance controls can be used for square wave measurements. Correspondingly, a "square wave" bridge as described above can always be used for sine wave measurements.

The coaxial transformer construction described above imposes limitations on the frequency response of the bridge. Saturation of the core and the limited secondary inductance restrict the low frequency response in direct and reverse operation, respectively. The high frequency response is limited by the coaxial cable and transformer capacitances, and by failure of high frequency compensation, should the detector bandwidth be extended substantially beyond 350 kc. To circumvent these limitations, we consider the circuit of FIGURE 4 which shows a transmission line equivalent of the circuit of FIGURES 2 and 3. The balance equation again is $Z_1 Z_2 = R^2$. Here a dummy section of coaxial cable 64 is added to compensate exactly the delay that the current in the series arm 63 experiences in passing back through the coaxial winding 62 on core 61. These cables are terminated in their characteristic impedance $r$. Note that the square wave generator drives the outer conductor of coaxial cable 62 directly; this is feasible at high frequencies, since the resistive drop due to the magnetizing current flowing through the outer conductor can be neglected. This bridge matches a generator impedance R and a detector impedance $r$. R is assumed to be much larger than $r$.

The bridge circuit of FIGURE 4 is a variant of the so-called distributed transformer, or transmission line pulse inverter, a type of balun widely used in u.h.f. impedance matching and known to possess very wide bandwidth. The upper frequency limit of the circuit of FIGURE 4 will be set by the difficulties of obtaining lumped parameter compensated resistors of the required precision, and also by anti-resonance in the coil, should its electrical length equal one wavelength at the exciting frequency.

Since the coaxial transformer construction provides in simple form two matched square wave sources, one of which can be grounded to function as an electrostatic shield for the ungrounded second, a flexible energizing source is made available which is suitable for modifications such as the bridge circuit of FIGURE 5 which uses the constant resistance network bridge principle. The block diagram of FIGURE 5 shows another bridge arrangement which permits one terminal of each of the reciprocal impedances 116 and 117 to be grounded as well as one terminal of detector 118 and one square wave energizing source 111.

Having thus described the invention, what is claimed is:

1. A square wave inductance bridge comprising a first arm including a first impedance and first and second resistors, one terminal of each being connected together at a common junction to form a T network, a second arm including a second impedance and a third resistor, one terminal of each being connected together, the second terminal of each of said impedances being connected to a common ground point, a first square wave source connected between the second terminal of said first resistor and said ground point, a second square wave source connected from the second terminal of said second resistor to the second terminal of said third resistor, a voltage indicator connected between said second terminal of said second resistor and said ground point, whereby said indicator shows a null balance when the transfer impedance of said T network equals the series impedance of said second arm with the voltage of said first source equal and opposite to the voltage of said second source.

2. A square wave inductance bridge comprising, a first arm including first and second resistors connected in series and a first impedance, one terminal of said impedance being connected to the common connection of said resistors, the other terminal of said impedance being grounded, thereby forming a T network, a second arm including a third resistor and a second impedance in series connection, the second terminal of said second impedance being grounded, a first square wave source having one output terminal grounded and a second output terminal connected to energize said T network through said first resistor, a second square wave source having one output terminal connected to energize said second arm through said third resistor, a voltage indicator having one terminal grounded and a second terminal connected to the second terminal of said second square wave source and to said T network through said second resistor, whereby said indicator shows a null balance when the transfer impedance of said T network equals the series impedance of said second arm with the voltage of said first source equal to the voltage of said second source.

3. A square wave inductance bridge compensated for stray capacitance and inductance comprising, a first arm including first and second resistors connected in series and a first impedance, one terminal of said impedance being connected to the common connection of said resistors, the other terminal of said impedance being grounded, thereby forming a T network, a second arm including a third resistor and a second impedance in series connection, the second terminal of said second impedance being grounded, a first square wave source having one output terminal grounded and a second output terminal connected to energize said T network through said first resistor, a second square wave source having one output terminal connected to energize said second arm through said third resistor, means shunting said first impedance to compensate for bridge unbalance caused by stray impedance in said second arm, means in said second arm to compensate for bridge unbalance caused by stray impedance in said first arm, a delay line in said T network to delay the current therein by a time interval equal to the delay of current in said second arm caused by said second source, means to equalize the time constant of said first and second impedances, a voltage indicator having one terminal grounded and a second terminal connected to the second terminal of said second square source and to said T network through said second resistor, whereby said indicator shows a null balance when the transfer impedance of said T network equals the series impedance of said second arm with the voltage of said first source equal to the voltage of said second source.

4. A square wave inductance bridge comprising, a first arm including a first impedance and first and second resistors, one terminal of each being connected together at a common junction, a second arm including a third resistor and a second impedance, one terminal of each being connected together, the second terminal of each of said impedances being connected to a common ground, a transformer for energizing said arms, said transformer having a toroidal magnetic core with a single layer primary winding placed thereon and a single layer of coaxial cable wound over said primary winding, the inner conductor of said coaxial cable being shielded electrostatically by the outer conductor of said cable to produce a unity ratio transformer with closely coupled windings, one end of said outer conductor being connected to said common ground, the ungrounded end of said outer conductor being connected to the second terminal of said first resistor of said first arm, said inner conductor being connected between the second terminal of said second resistor of said first arm and the second terminal of said third resistor, a voltage indicator connected from the common junction of said inner conductor and said first arm to said common ground, a square wave generator connected to energize said transformer primary, the connections of said inner conductor being so polarized that said indicator shows a null balance provided the transfer impedance of said first arm equals the series impedance of said second arm.

5. A square wave inductance bridge compensated for stray capacitance and inductance comprising, a first arm including a first impedance and first and second resistors, one terminal of each being connected together at a common junction, a second arm including a third resistor and a second impedance, one terminal of each being connected together, the second terminal of each of said impedances being connected to a common ground, a transformer for energizing said arms, said transformer having a toroidal magnetic core with a single layer primary winding placed thereon and a single layer of coaxial cable wound over said primary winding, the inner conductor of said coaxial cable being shielded electrostatically by the outer conductor of said cable to produce a unity ratio transformer with closely coupled windings, one end of said outer conductor being connected to said common ground, the ungrounded end of said outer conductor being connected to the second terminal of said first resistor of said first arm, said inner conductor being connected between the second terminal of said second resistor of said first arm and the second terminal of said third resistor, means including an inductance coil and a variable capacitor shunting said first impedance to compensate for bridge unbalance caused by stray impedance in said second arm, means including an inductance coil and a variable capacitor in said second arm to compensate for bridge unbalance caused by stray impedance in said first arm, means to equalize the time constants of said first and second impedances, and a delay line connected in said first arm to delay the current therein by a time interval equal to the delay introduced into said second arm current flow by said inner conductor, a voltage indicator connected from the common junction of said inner conductor and said first arm to said common ground, a square wave generator connected to energize said transformer primary, the connections of said inner conductor being so polarized that said indicator shows a null balance provided the transfer impedance of said first arm equals the series impedance of said second arm.

References Cited by the Examiner

UNITED STATES PATENTS

| | | |
|---|---|---|
| 2,232,792 | 2/41 | Levin. |
| 2,677,102 | 4/54 | Young _____ 324—62 |
| 2,783,435 | 2/57 | Wilhelm _____ 324—62 |

FOREIGN PATENTS

| | | |
|---|---|---|
| 735,917 | 8/55 | Great Britain. |
| 821,227 | 10/59 | Great Britain. |

OTHER REFERENCES

"The Twin-T, a New Type of Null Instrument for Measuring Impedance at Frequencies Up to 30 Megacycles," article by D. B. Sinclair, reprint A–18, Engineering Dept., General Radio Co., from Proc. of the IRE, July 1940, pp. 311–318.

"New Bridge Technique," article in Wireless World, January 1950, pp. 8–10.

Lamont: "A Square Wave Inductance Bridge," Electronic Engineering, August 1966, pp. 357–359.

WALTER L. CARLSON, *Primary Examiner.*

SAMUEL BERNSTEIN, *Examiner.*